United States Patent [19]
Ward, III

[11] 4,082,431
[45] Apr. 4, 1978

[54] IMAGE PROCESSING SYSTEM USING INCOHERENT RADIATION AND SPATIAL FILTER HOLOGRAM

[75] Inventor: Joseph E. Ward, III, Woodbury, Minn.

[73] Assignee: Minnesota Mining and Manufacturing Company, St. Paul, Minn.

[21] Appl. No.: 672,614

[22] Filed: Apr. 1, 1976

Related U.S. Application Data

[63] Continuation-in-part of Ser. No. 570,957, Apr. 22, 1975, abandoned.

[51] Int. Cl.² .................. G02B 5/32; G02B 27/38; G03H 1/16
[52] U.S. Cl. ............ 350/162 SF; 350/205; 350/3.82; 364/515; 364/825; 364/827
[58] Field of Search .............. 350/162 SF, 3.5, 205, 350/206; 235/181; 356/71

[56] References Cited
U.S. PATENT DOCUMENTS
337,068  2/1968  Dobrin et al. ............... 350/162 SF

OTHER PUBLICATIONS
Lanzl et al, *Optik*, vol. 35, No. 5, 1972, pp. 524-535.
Lowenthal et al, *Comptes Rendus Acad. Sc.Paris*, Series B, vol. 266, Feb. 1968, pp. 542-545.
Caulfield, *Applied Optics*, vol. 13, No. 5, May 1974 pp. 996-997.
Goodman, *Introduction To Fourier Optics*, McGraw-Hill Book Co., 1968 pp. 165-166.

*Primary Examiner*—Ronald J. Stern
*Attorney, Agent, or Firm*—Cruzan Alexander; Donald M. Sell; William B. Barte

[57] ABSTRACT

A linear optical processing system in which a spatial filter in the form of a Fourier transform hologram is included with a lens for processing incoherent electromagnetic radiation. Such a system provides a given real, two-dimensional transfer function for spatially filtering incoherent radiation within a range of spatial frequencies $0 \leq \omega \leq \Omega$. The filter is made by forming a mask of a graph of a point spread function which is the inverse transform of the desired transfer function, and employing the mask in a coherent system to produce a Fourier transform hologram of the mask. Spatial filters are designed for providing the resultant systems with various transfer functions, including (a) a directional response for passing substantially higher spatial frequency components in a first direction than are passed in a second direction; (b) a selective attenuator response; (c) a notch filter response; (d) a correctional filter response; and (e) a linear minimum mean square error response. The systems are useful for recognizing specified patterns from a plurality of patterns and for determining the concentration of a species of particulate matter having a predetermined specific pattern within a sample of particles.

22 Claims, 7 Drawing Figures

IMAGE PROCESSING SYSTEM USING INCOHERENT RADIATION AND SPATIAL FILTER HOLOGRAM

CROSS-REFERENCE TO RELATED CASE

This application is a continuation-in-part of an earlier application, U.S. Ser. No. 570,957, which was filed Apr. 22, 1975, now abandoned and is related to a co-pending U.S. patent application, Ser. No. 699,785 filed on June 25, 1976 by the present inventor and John C. Huber, entitled "Copying of Graphic Images by Processing of Incoherent Radiation with a Spatial Filter", which application is a continuation-in-part of an earlier application Ser. No. 570,349, filed on Apr. 22, 1975, and which is now abandoned.

BACKGROUND OF THE INVENTION

1. Field of the Invention

The present invention generally relates to image processing utilizing incoherent radiation and is specifically directed to image processing with holographic spatial filters which, when combined with a lens in an optical system, provide a priori specified transfer functions.

2. Discussion of the Prior Art

The processing of images containing graphic information with spatially incoherent electromagnetic radiation has a distinct advantage over systems utilizing coherent radiation. Much graphic information is printed on paper. In order to process images containing such graphic information with coherent laser-optical systems, the information must be converted into transparency form. With spatially incoherent radiation, graphic images may be processed directly from the paper.

The use of a hologram for pattern detection by correlation filtering in spatially incoherent optical systems was suggested in 1965 by Armitage and Lohmann in Appl. Opts. 4, 461 (1965). This system, including an incoherent light source and a combination of a lens and a spatial filter, is insensitive to shifts in the position of the hologram. Armitage and Lohmann recognized that it is not an easy problem to prescribe first the optical transfer function for the system to be provided by the spatial filter and then look for a suitable pupil function for defining the hologram. The pattern detection application, which utilizes a matched filter initially formed from an image of the pattern to be detected, and which finds utility in shift invarient character recognition, has appeared to be the only exception to this difficult mathematical problem.

Lowenthal and Werts, in Compt. rend. 266 B, 542 (1968), noted that both correlation and convolution image processing operations could be performed with an optical system including a hologram and lens using spatially incoherent light. In particular, they state that when one is given, a priori, the point spread function for an optical system, the required pupil function for the lens may be obtained by recording this point spread function in a hologram. Lowenthal and Werts' only reported application, however, was to employ the correlation operation to recognize alphabetic characters.

In 1971, Maloney, in Appl. Opt. 10, 2127 (1971) and Appl. Opt. 10, 2554 (1971), proposed a system for character recognition using Lohmann's incoherent correlation techniques. He incorporated the lens directly into the hologram using methods well known in the art.

Also in 1971, Lohmann and Werlich, in Appl. Opt. 10, 670 (1971), proposed further applications utilizing pattern detection by correlation filtering with spatially incoherent optical systems. Correlations between line drawings and between grey-tone objects were disclosed. However, Lohmann and Werlich stated: "Additional spatial filtering for better target discrimination (such as suppression of the useless low frequencies) cannot be done in incoherent image formation, at least not as straight-forwardly as in the coherent method." Lohmann and Werlich then go on to suggest the use of computer generated Fourier holograms as correlation filtering elements for pattern detection.

Thus, the prior art fails to disclose or suggest how to proceed from specific incoherent radiation correlation techniques to the more general optical processing applications which require an a priori specification of the transfer function.

SUMMARY OF THE INVENTION

The present invention provides a method of producing a spatial filter which when combined with a lens in a linear system for processing incoherent electromagnetic radiation, provides a given real, two-dimensional transfer function $F(\omega)$ for spatially filtering said radiation within an interval of spatial frequencies $0 \leq \omega \leq \Omega$.

While the term spatial filtering is conventionally used in the publications referred to hereinabove, and for uniformity, will be used throughout this application, the term is not completely descriptive when applied to incoherent optical systems in which there is no physical transform plane. Accordingly, the spatial filter of the present invention may also be appropriately described in terms of a pupil function.

One embodiment of the present invention is directed to a method in which a two-dimensional mask having regions of varying optical transmissivity or reflectivity is generated, which mask is a representation of a point spread function. Coherent electromagnetic radiation beam is impinged onto the mask and radiation passing through the mask is impinged onto a medium responsive to the radiation. The passed coherent electromagnetic radiation beam is interferred with an electromagnetic radiation reference beam which is coherent with the other beam at the medium to produce as the spatial filter a hologram corresponding to the mask. This method is particularly characterized by the step of forming the mask, which includes the sub-steps of providing a medium including a planar surface having a rectangular coordinate grid including a plurality of regularly spaced regions, and developing the optical transmissivity or reflectivity of each region such that regions symmetrically disposed with respect to the coordinate axes of the grid, thereby corresponding to a real transfer function $F(\omega)$, have the same optical transmissivity or reflectivity. The transmissivity or reflectivity of each region is defined in terms of the inverse Fourier transform of an orthogonal series expansion of the selected design transfer function, $F'(\omega)$ over the range $0 < \omega_x < \Omega_x$ and $0 < \omega_y < \Omega_y$, according to the following expression:

$$F'(\omega_x, \omega_y) = \sum_{m=1}^{\infty} \sum_{n=1}^{\infty} \psi_{mn} \left( \frac{2 \sin \frac{m\pi}{\Omega_x} \omega_x}{\omega_x} \right) \left( \frac{2 \sin \frac{n\pi}{\Omega_y} \omega_y}{\omega_y} \right).$$

This expression may then be inverse transformed into the corresponding point spread function $h(x,y)$. The expression of $F(\omega_x,\omega_y)$ can be shown to be in terms of the complete orthogonal set $$\left[\frac{\sin k_n\delta}{\delta}\right].$$

In practice, the upper limits of the series are taken to be finite integers M and N to allow physical construction of the corresponding point spread function $h(x,y)$. The coefficients of the expression are given by $$\psi_{mn} \cdot \frac{1}{\Omega_x\Omega_y} \int_0^{\Omega_x} \int_0^{\Omega_y} \omega_x\omega_y F(\omega_x, \omega_y) \sin\left(m\pi \frac{\omega_x}{\Omega_x}\right) \sin\left(n\pi \frac{\omega_y}{\Omega_y}\right) d\omega_x d\omega_y$$

Accordingly, the point spread function is given by the following expression:

$$h(x,y) = \sum_{m=1}^{M} \sum_{n=1}^{N} \psi_{mn} \operatorname{rect}\left(\frac{\Omega_x x}{m\pi}\right) \operatorname{rect}\left(\frac{\Omega_y y}{n\pi}\right),$$

wherein $h(x,y)$ is the point spread function corresponding to a selected design transfer function $F'(\omega_x,\omega_y)$, $m,n$ are spatial limits in the $x$ and $y$ directions, respectively, $\omega_x$ is the spatial frequency along the $x$-direction,
$\omega_y$ is the spatial frequency along the $y$-direction,
$\Omega_x$ is the cutoff spatial frequency in the $x$-direction,
$\Omega_y$ is the cutoff spatial frequency in the $y$-direction, $\operatorname{rect}\left(\frac{\Omega_x x}{m\pi}\right) = 1$ for $0 \leq x \leq \frac{m\pi}{\Omega_x}$, $\operatorname{rect}\left(\frac{\Omega_x x}{m\pi}\right) = 0$ for $x > \frac{m\pi}{\Omega_x}$, $\operatorname{rect}\left(\frac{\Omega_y y}{m\pi}\right) = 1$ for $0 \leq y \leq \frac{n\pi}{\Omega_y}$, $\operatorname{rect}\left(\frac{\Omega_y y}{n\pi}\right) = 0$ for $x > \frac{n\pi}{\Omega_y}$, $F'(\omega_x,\omega_y)$ is the design, i.e., a priori, transfer function of the desired spatial filter, and is defined between the limits $0 \leq \omega_x \leq \Omega_x$ and $0 \leq \omega_y \leq \Omega_y$, such that $F(\omega_x,\omega_y) = R[(1/A) F'(\omega_x,\omega_y) + (B/A) \delta(\omega_x,\omega_y)]$. This Dirac delta function represents a zero frequency or background component which is added to the processed image by the bias term, B, when present in the point spread function.

$R = (A/1+B)$, A is a multiplier constant equal to the maximum value of $h(x,y)$ minus the minimum value of $h(x,y)$ and B is a bias constant equal to the negative of the minimum value of $h(x,y)$, thereby enabling the point spread function $h(x,y)$ corresponding to the transfer function $F(\omega_x,\omega_y)$ to be real and in the range $0 \leq h(x,y) \leq 1$.

The factor R equals 1 except in those instances where $h(x,y)$ is outside the interval $0 \leq h(x,y) \leq 1$ in which case the point spread function is not realizable. In such instances $h(x,y)$ is normalized and biased so that it will fall within the interval zero and one according to the following expression:

$$h'(x,y) = (1/A)[h(x,y) + B]$$

Thus, in those instances where $h(x,y)$ is outside the interval $0 \leq h(x,y) \leq 1$, it is the normalized function $h'(x,y)$ that is generated to provide the mask used in producing the spatial filter.

It is recognized that a two-step procedure may also be used to realize negative going point spread functions. In such a procedure, the point spread function is divided into positive and negative going portions. The positive portion is generated and used to obtain a processing image as specified herein, while the negative of the negative going portion is separately generated and similarly used. The resultant two incoherent optical processing systems are combined in such a way as to obtain the difference between the positive and negative processed images. With this approach, a broader range of applications can be effected.

In another embodiment, this method is characterized by generating the two-dimensional mask representing a point spread function from an a priori transfer function expressed in circular coordinates as $F'(\omega_r,\omega_\theta) = F'(\omega_r)$, wherein the point spread function is $$h(r) = \sum_{j=1}^{M} \psi_j \operatorname{circ}(r/a_j),$$

wherein
$a_j$ is the spatial limit along the r-axis,
$\omega_r$ is the spatial frequency along the r-axis,
$\Omega_r$ is the cutoff spatial frequency in the r-direction,
$\operatorname{circ}(r/a_j) = 1$ for $0 \leq r \leq a$,
$\operatorname{circ}(r/a_j) = 0$ for $r > a$, $$\psi_j = \frac{1}{\pi\Omega^2 a_j J_2^2(a_j\Omega)} \int_0^{\Omega} \omega_r^2 F(\omega_r) J_1(a_j\omega_r) d\omega_r$$

and the coefficients $a_j$ are the solutions to:

$$J_1(a_j\Omega) = 0 \text{ for } j = 1,2,$$

$F'(\omega_r)$ is the design, i.e., a priori transfer function of the desired spatial filter and is defined between the limits $0 \leq \omega_r \leq \Omega$ such that $$F(\omega) = R[1/A F'(\omega) + B/A \delta(\omega_r)],$$

where
$R = (A/1+B)$, A is a multiplier constant equal to the maximun value of $h(r)$ minus the minimum value of $h(r)$, and B is a bias constant equal to the negative of the minimum value of $h(r)$, thereby enabling the point spread function $h(r)$ corresponding to the transfer function for $F(\omega)$ to be real and in the range $0 \leq h(r) \leq 1$.

When $h(r)$ is outside the interval $0 \leq h(r) \leq 1$, it is also normalized in the same manner as described above for $h(x,y)$.

The present invention further provides an optical system for processing an original image containing a plurality of different complex patterns to provide a modified image in which at least one of said complex patterns is substantially unaltered and in which certain frequency components of at least one complex pattern are attenuated. A complex pattern is defined as being of a higher order than a single line. This system comprises a source of spatially incoherent electromagnetic radiation positioned for directing said radiation to an object to provide an intensity distribution of electromagnetic radiation from the object; a spatial filter which is a Fourier transform hologram of a two-dimensional point spread function for spatially processing said incoherent radiation distributed from the object within an interval of spatial frequencies $0 \leq \omega \leq \Omega$, and a lens for providing a processed image of said radiation distributed from said object at a predetermined image plane. The spatial filter hologram corresponds to a point spread function and to an optical transfer function in which the transmissivity or reflectivity of the hologram causes the optical transfer function to be controlled to enable selective attenuation of predetermined discrete spatial frequency components in said interval. The system provides processed convolution and/or correlation images of said filtered radiation distributed from said object at the predetermined image plane, wherein within said processed convolution and/or correlation images, said predetermined discrete spatial frequency components of said original image are attenuated and at least one of said complex patterns is substantially unaltered.

In separate embodiments, the spatial filters in the optical system provide various optical transfer functions including (a) a directional response for passing substantially higher spatial frequency components in a first direction than are passed in a second direction; (b) a selective attenuator response; (c) a notch filter response; (d) a correctional filter response; and (e) a linear minimum means square error response.

In another embodiment, the spatial filter provides a linear minimum mean square error response and is included in an apparatus for recognizing specified patterns from a plurality of patterns and in an apparatus for determining the concentration of a species such as particulate matter having a predetermined specific pattern within a plurality of species.

DESCRIPTION OF THE PREFERRED EMBODIMENTS

Figure 1:
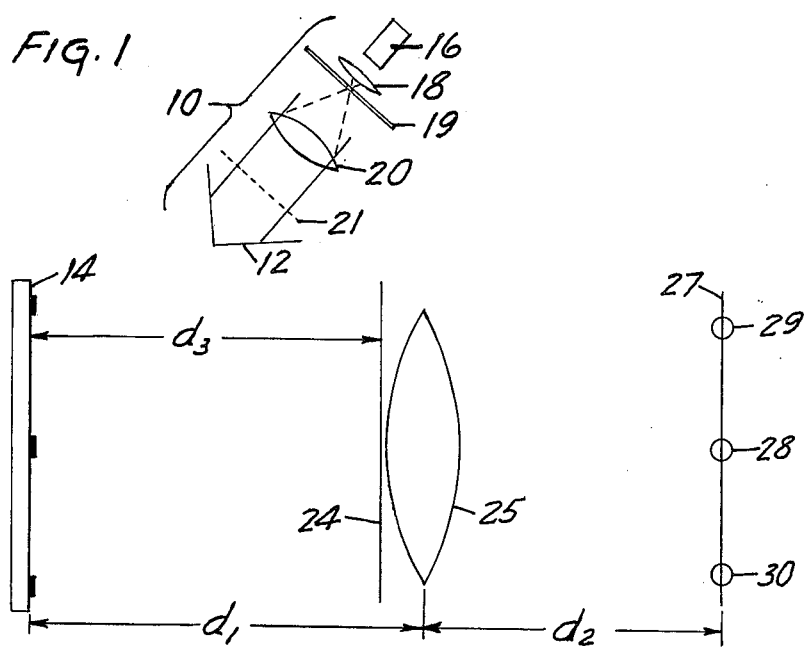
FIG. 1 is a schematic view of an optical system for image processing according to the present invention.

An optical system for image processing in accordance with the present invention is shown in FIG. 1. The system includes a source 10 for spatially incoherent radiation, such as visible light 12 positioned for directing such radiation to an object 14 to provide an intensity distribution of radiation from said object. The source 10 of spatially incoherent radiation may be a reasonably monochromatic light source such as a laser from which the radiation has been rendered spatially incoherent, a filtered mercury arc source, or narrow band phosphors such as those in a cathode ray tube screen. In the preferred embodiment, the incoherent source 10 includes a laser 16, a microscope objective 18 and pin hole aperture plate 19, a collimating lens 20 and a spinning diffuser 21. The diffuser 21 is frosted glass.

The system of FIG. 1 also includes a spatial filter 24 and a lens 25. It should be recognized that both the spatial filter 24 and the lens 25 can be integral parts of the same hologram. In this embodiment, the lens 25 is a simple imaging lens. The lens 25 also may be a fresnel zone plate or a discrete holographically recorded lens.

The spatial filter 24 provides a Fourier transform hologram of a given two-dimensional optical transfer function $F(\omega)$ for spatially filtering the light distributed from the object 14 within an interval of spatial frequencies $0 \leq \omega \leq \Omega$. The optical transfer function is shaped to an a priori specification consistent with incoherent imaging. Also, the optical transfer function may be shaped to approximate other a priori specifications by properly limiting or biasing the corresponding point spread function. Although the optical transfer functions provided in the embodiments described herein utilize rectangular coordinate and circular cylindrical coordinate systems, ellipsoidal, parabolic, spherical, prolate spheroidal and other systems also may be used.

The lens 25 provides three process images of the filtered light distributed from the object at a predetermined image plane 27. These three images are: the usual geometric image 28 of the object plane graphic, the correlation image 29, and the convolution image 30. In the preferred embodiments of the optical system for image processing described herein, the convolution image is utilized. However, in special cases where $h(x,y) = h(-x,-y)$, the convolution and correlation images are identical. If one constructs the intensity distribution mask 32 with $h(-x,-y)$, the roles of the convolution image and correlation image would be reversed.

The convolution and/or correlation images may be detected by some suitable detecting means positioned in the image plane 27 at the convolution image 30 and/or the correlation image 29. Detectors include such means as the eye, a vidicon tube, photographic film, a charge coupled device, or very simple detectors such as a silicon detector.

Figure 3:
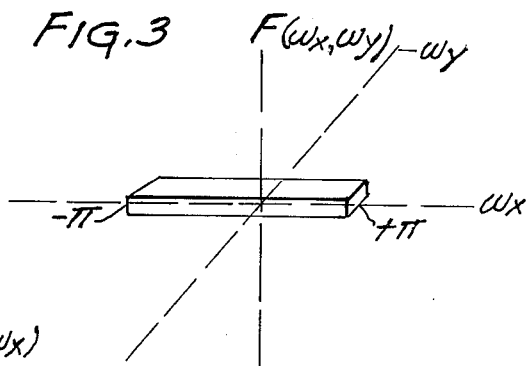
FIGS. 3, 4 and 5 are plots of design specifications of optical transfer functions provided by the spatial filter, together with a lens in a linear incoherent optical system according to various embodiments of the present invention.
Figure 4:
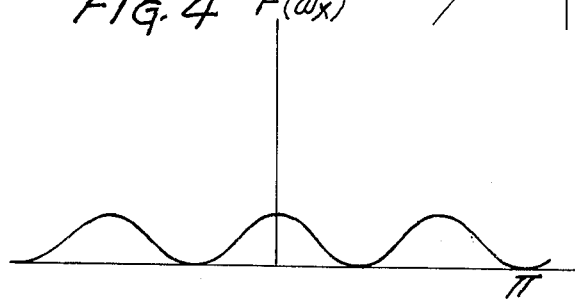
Figure 5:
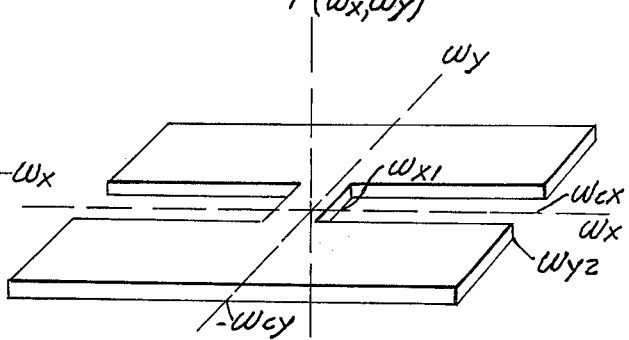

In making the spatial filter hologram 24 in accordance with the present invention, a real, two-dimensional transfer function is first specified, a priori. Generally, the transfer function $F(\omega)$ is defined for an interval of spatial frequencies $0 \leq \omega \leq \Omega$. These are the regions of spatial frequencies over which the optical transfer function is controlled. Many such functions are well known and are readily expressed in a variety of coordinate systems. Plots of three representative optical transfer functions are shown in FIGS. 3-5.

In order to selectively filter spatial frequencies, the spatial filter 24 is designed to have a practical cutoff spatial frequency $\omega_c$ which particular frequency is usually chosen to be somewhat less than $\Omega$. This ensures that the system response will be zero in a bank immediately above the selected cutoff spatial frequency $\omega_c$. In the examples described hereinafter, $\Omega$ was arbitrarily chosen to be $2\pi$. The practical cutoff spatial frequencies $\omega_c$ were similarly chosen to be $\pi$ or less.

The second step in making the spatial filter 24 involves generating the point spread function which corresponds to the a priori designed transfer function. Since the optical transfer function is the Fourier transform of the point spread function of an optical system which relates the Fourier transform of the processed (or output) image intensity to the Fourier transform of the input image intensity of the illuminated object, the point spread function may be generated by an inverse Fourier transformation or in accordance with either of the above described equations for $h(x,y)$ and $h(r)$ depending upon whether rectangular or circular cylindrical coordinates are preferred. With reference to these two equations, although M and N = ∞ in theory, a small number is usually chosen empirically to give an approximation of the required accuracy.

Once the required point spread function is generated, the function is drawn with a computer plotter and then photo reduced to form the mask. A mask is produced which, when illuminated with coherent light, will impart a spatial intensity distribution in accordance with the point spread function. For example, a computer and plotter may be used to produce a halftone drawing of the point spread function.

For the examples described hereinafter, it is necessary to provide a normalized point spread function $h'(x,y)$ or $h'(r)$ as described above. The total area is divided into homogeneous resolution cells, and the cell dimensions are selected to provide the resolution desired. The blackened area of any cell is a function of the spatial intensity. This procedure provides a negative of $h'(x,y)$.

Although a computer-plotter approach is described, other approaches may be utilized, such as photographing the display of a graphic display terminal. In addition, the resultant mask could be photo reduced or photo enlarged prior to produce the spatial filter.

Figure 2:
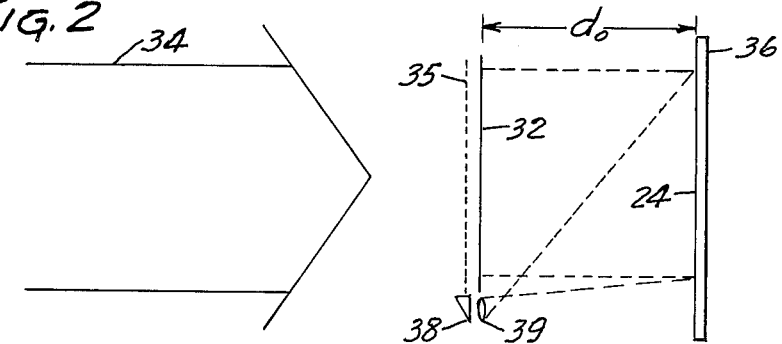
FIG. 2 is a schematic representation of the method of making a spatial filter according to the present invention.

Referring to FIG. 2, the spatial filter hologram 24 is produced in the form of a Fourier transform hologram in a conventional manner, using the mask 32 defined by the generated point spread function $h'(x,y)$ or $h'(r)$. A coherent light beam 34 is passed through a stationary diffuser 35, such as frosted glass, and then through the mask 32 to a holographic recording medium 36. The coherent radiation beam 34 is also passed through a combination of a prism 38 and a lens 39 to provide a reference beam. The reference beam is interferred with the beam that is passed through the mask 32 to form the spatial filter 24 in the holographic recording medium 36.

The distance between the mask 32 and the holographic recording medium 36 is $d_o$. The holographic recording medium may be a photographic plate, a plate coated with a photopolymer or various other media well known in the holographic recording art.

In the system shown in FIG. 1, the spatial filter 24 and the lens 25 may be essentially in the same plane. The distance between the object 14 and the lens 25 is $d_1$. The distance between the object 14 and the spatial filter 24 is $d_3$. The distance between the lens 25 and the image plane 27 is $d_2$. The relationship $(1/d_1) + (1/d_2) = (1/f)$, where $f$ is the focal length of the lens 25, must be maintained. The design a priori optical transfer function is realized when $d_3 = d_o$. However, the scale of the optical processing may be varied by changing the ratio of $d_o/d_3$.

Several examples of optical systems for image processing of incoherent light with a spatial filter are provided. These systems may be included in an apparatus for processing an original image containing a plurality of different complex patterns to provide a modified image in which predetermined discrete spatial frequency components of at least one such complex pattern are attenuated and in which at least one of such complex patterns is substantially unaltered. These systems are distinguished from one another by the design characteristics of the spatial filter 24.

EXAMPLE 1

In one embodiment, the spatial filter provides the optical system with a directional selective response for passing substantially higher spatial frequency components of at least one of said discrete color components in a first direction than are passed in a second direction. A system including this spatial filter may be utilized to examine contour maps for features oriented in a specific direction. As such, the system may be considered to be a feature extractor. The optical transfer function of the system is selected so that $x$ directed spatial frequencies will be passed in preference to $y$ directed frequencies, or vice versa. The system possesses the optical transfer function $$F(\omega_x,\omega_y) = R[(1/A) F'(\omega_x,\omega_y) + (B/A) \delta(\omega_x,\omega_y)],$$

where $\delta(\omega_x,\omega_y)$ is the Dirac delta function, $F'(\omega_x,\omega_y)$ is the design specification, dictated by the desired directional response, $R = (A/1+B)$, $A$ = a multiplier constant equal to the maximum value of the corresponding point spread function $h(x,y)$ minus the minimum value of $h(x,y)$, and $B$ = a bias constant equal to the negative of the minimum value of $h(x,y)$. A and B are selected to enable the point spread function $h(x,y)$ corresponding to the transfer function $F(\omega_x,\omega_y)$ to be real and in the range of $0 \leq h(x,y) \leq 1$.

A convenient expression defining the design specification for the transfer function $F'(\omega_x,\omega_y)$ in rectangular coordinates is $F'(\omega_x, \omega_y) = \text{rect}(\omega_x/\omega_{cx}) \text{rect}(\omega_y/\omega_{cy})$, where $\omega_{cx}$ and $\omega_{cy}$ are a cutoff spatial frequencies in the $x$ and $y$ directions respectively, $\text{rect}(\omega_x/\omega_{cx}) = 1$ for $0 \leq |\omega_x| \leq \omega_{cx}$, $\text{rect}(\omega_x/\omega_{cx}) = 0$ for $|\omega_x| > \omega_{cx}$, $\text{rect}(\omega_y/\omega_{cy}) = 1$ for $0 \leq |\omega_y| \leq \omega_{cy}$, $\text{rect}(\omega_y/\omega_{cy}) = 0$ for $|\omega_y| > \omega_{cy}$ and $\omega_{cx} \neq \omega_{cy}$ A plot of this design specification in frequency space is shown in FIG. 3.

Once the transfer function $F(\omega_x, \omega_y)$ is selected, the coefficients for the function may be determined from the following expression:

$$\psi_{mn} = \frac{1}{\Omega_x \Omega_y} \int_0^{\Omega_x} \int_0^{\Omega_y} \omega_x \omega_y F'(\omega_x,\omega_y) \sin\left(\frac{m\pi}{\Omega_x}\omega_x\right) \sin\left(\frac{n\pi}{\Omega_y}\Omega_y\right) d\omega_x d\omega_y.$$

Upon insertion of the expression for $F'(\omega_x, \omega_y)$, $\psi_{mn}$ may be solved as follows:

$$\psi_{mn} = \frac{4}{m^2n^2\pi^2} \{\sin(\frac{m\pi}{2}) - \frac{m\pi}{2} \cos\frac{m\pi}{2}\} \{\sin(\frac{n\pi}{20}) - \frac{n\pi}{20} \cos\frac{n\pi}{20}\}$$

Figure 6:
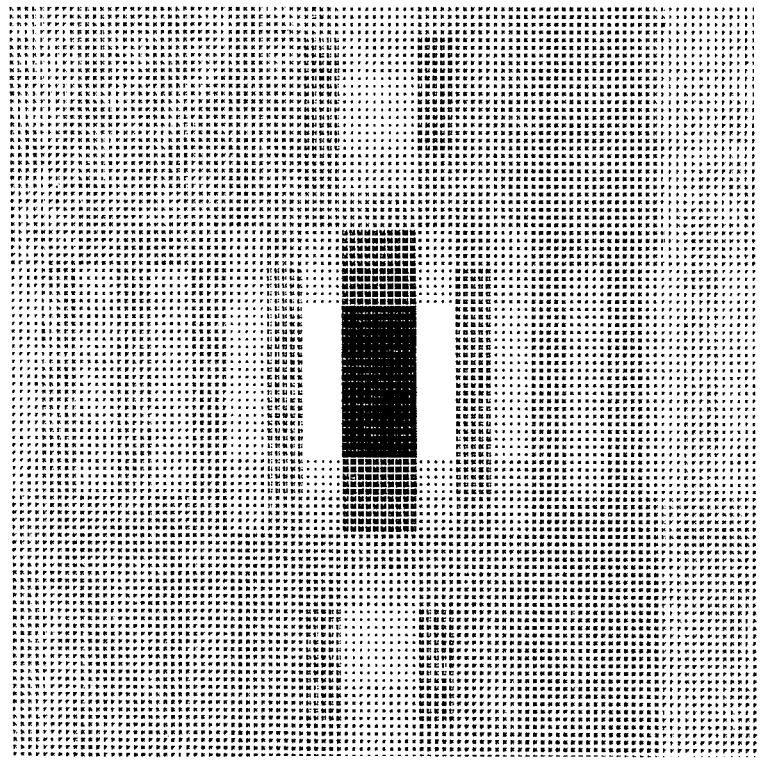
FIG. 6 and 7 are plots of the resulting point spread functions utilized to form the masks which in turn form the spatial filter holograms corresponding to the transfer functions of FIGS. 3 and 4.

The resulting incoherent point spread function is:

$$h(x,y) = \sum_{m=1}^{10} \sum_{n=1}^{10} \psi_{mn} \, rect(\frac{2x}{m}) \, rect(\frac{2y}{m}),$$

and may be plotted as shown in FIG. 6 to form a mask corresponding to the point spread function. The mask is used to form the spatial filter, i.e., the Fourier transform hologram according to the method outlined in conjunction with the discussion of FIG. 2 hereinabove. The hologram may then be used as the spatial filter in the system of FIG. 1. Incoherent light reflected from the object 14 is accordingly selectively filtered to preferentially pass light corresponding to features of the object oriented in 1 direction 0 preference to features in the other direction, thereby allowing selected features of the image to be resolved by the system.

Where contour map examination is desired, the design specification would be selected to allow resolution of shapes up to a specified steepness at specified locations to be resolved. These parameters would be specified in terms of corresponding x- and y-coordinates, ultimately resulting in a mask similar to that shown in FIG. 6, which when recorded as a hologram, selectively passes light reflected from portions of the map indicative of the specified parameters.

EXAMPLE 2

In another embodiment, the spatial filter also provides the optical system with a directionally selective response. In this embodiment, the optical transfer function is selected with respect to a circular coordinate system. In such a system, the optical transfer function is given in terms of:

$$F(\omega_r, \omega_\theta) = R[1/A \, F'(\omega_r, \omega_\theta) + B/A \, \delta(\omega_r, \omega_\theta)],$$
where $\delta(\omega_r, \omega_\theta)$, $F'(\omega_r, \omega_\theta)$, R, A and B are previously defined, modified to correspond to circular coordinates.

A convenient expression defining the design specification for the transfer function $F(\omega_r, \omega_\theta)$ in radial coordinates is $$F'(\omega_r, \omega_\theta) = circ(\omega_r/\omega_{cr})[rect(\omega_\theta/\omega_{c\theta}) + rect(\omega_\theta - \pi)/\omega_{c\theta})],$$
where $\omega_{cr}$ and $\omega_{c\theta}$ are cutoff spatial frequencies along the r and $\theta$ axes respectively, $circ(\omega_r/\omega_{cr}) = 1$ for $0 \leq \omega_r \leq \omega_{cr}$, $circ(\omega_r/\omega_{cr}) = 0$ for $\omega_r > \omega_{cr}$, $rect(\frac{\omega_\theta}{\omega_{c\theta}}) = 1$ for $0 \leq |\omega_\theta| \leq \omega_{c\theta}$, $rect(\frac{\omega_\theta}{\omega_{c\theta}}) = 0$ for $|\omega_\theta| > \omega_{c\theta}$, $rect(\frac{\omega_\theta - \pi}{\omega_{c\theta}}) = 1$ for $0 \leq |\omega_\theta - \pi| \leq \omega_{c\theta}$, and $rect(\frac{\omega_\theta - \pi}{\omega_{c\theta}}) = 0$ for $|\omega_\theta - \pi| > \omega_{c\theta}$ Once the transfer function $F(\omega_r, \omega_\theta)$ is selected, the coefficients for the function may be determined in an analogous manner to that set forth in Example 1. The point spread function for the optical transfer function may then be determined by Fourier transformation of $F'(\omega_r, \omega_\theta)$ and may be plotted and used as a mask to form the spatial filter according to the method outlined hereinabove.

EXAMPLE 3

In another embodiment, the spatial filter provides the optical system with a notch filter response wherein all spatial frequency components in one or more directions within a give band of spatial frequencies except for one or more discrete subbands of spatial frequency components within said given band are substantially passed and wherein the sub-band components are substantially attenuated. Such a filter may be designed to remove unwanted portions of a graphic image. As such, it removes an unwanted band of spatial frequencies. For example, one may wish to reproduce a historical document having stains or smudges over certain words. This embodiment of the present invention permits reproduction of the document without the stains. The system possesses the optical transfer function:

$$F(\omega_x, \omega_y) = R[1/A \, F'(\omega_x, \omega_y) + B/A \, \delta(\omega_x, \omega_y),$$
where $\delta(\omega_x, \omega_y)$, $F'(\omega_x, \omega_y)$ R, A and B are as defined hereinabove. The design specification $F'(\omega_x, \omega_y)$ is dictated by the desired notch filter response, and may be conveniently expressed as:

$F'(\omega_x, \omega_y) = F'(\omega_x) F'(\omega_y)$, where $$F'(\omega_x) = \frac{1}{2}[1 + \cos\frac{2\pi}{(aT_1)}\omega_x] \, rect(\frac{\omega_x}{T_1}), \text{ and}$$

$$F'(\omega_y) = rect(\frac{\omega_y}{\frac{1}{3\Omega_y}}),$$

wherein
$rect(\omega_x/T_1) = 1$ for $0 \leq |\omega_x| \leq T_1$, $rect(\omega_x/T_1) = 0$ for $|\omega_x| > T_1$, $T_1 \leq \Omega_x$, and $0 < a < 1$.

A plot of the design specification of this optical transfer function is shown in FIG. 4.

Once the transfer function $F(\omega_x, \omega_y)$ is selected, the coefficients for the function may be determined from the following expressions:
$\Psi_{mn} = \Psi_m \Psi_n$, where $$\psi_m = \frac{\Omega_x}{2}(\frac{1}{m\pi})^2[\sin\frac{m\pi}{2} = \frac{m\pi}{2}\cos\frac{m\pi}{2}]$$
$$+ \frac{\Omega_x}{4}(\frac{1}{(m+6)\pi})^2[\sin(\frac{m+6}{2}\pi) -$$
$$(\frac{m+6}{2})\pi\cos(\frac{m+6}{2}\pi)]$$

$$+ \frac{\Omega_x}{4} \left( \frac{1}{(m-6)} \right)^2 [\sin\left(\frac{m-6}{2}\pi\right) - \left(\frac{m-6}{2}\right)\pi \cos\left(\frac{m-6}{2}\pi\right)]$$

(the third term being zero for $m=6$), and $$\psi_{mn} = \Omega_y \left( \frac{1}{n\pi} \right)^2 [\sin\left(\frac{n\pi}{3}\right) - \frac{n\pi}{3} \cos\left(\frac{n\pi}{3}\right)]$$

Figure 7:
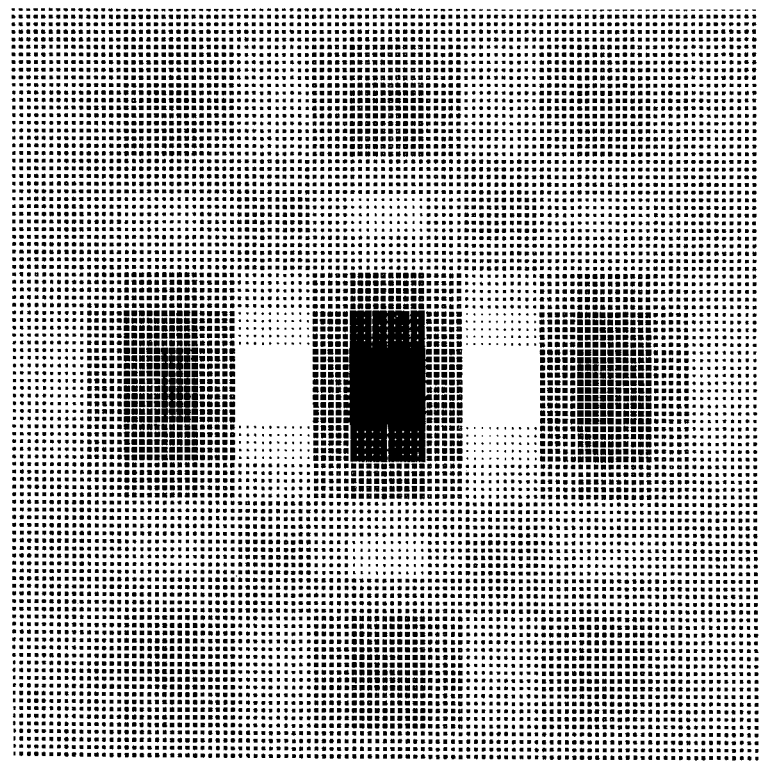

The resulting point spread function is:

$$h(x,y) = \sum_{m=1}^{10} \sum_{n=1}^{10} \psi_{mn} \, rect\left(\frac{\Omega_x}{m\pi} x\right) rect\left(\frac{\Omega_x}{n\pi} y\right),$$

and may be plotted as shown in FIG. 7 and used as a mask to form the spatial filter hologram according to the method outlined in conjunction with the discussion of FIG. 2. Incoherent light reflected from the object 14 is accordingly selectively passed, controlled by the spatial response of the filter. For example, stains on an original documemt may be determined to be substantially larger than test materials. Accordingly, lower spatial frequencies associated with stains, i.e., those between zero and those spatial frequencies associated with the recognition of the test material may be attenuated.

EXAMPLE 4

In a similar embodiment, the spatial filter may be selected to provide the optical system with a notch filter response by selecting the optical transfer function with respect to a circular coordinate system. In such a system, the optical transfer function may be expressed by:

$$F(\omega) = R[1/A \, F'(\omega,\omega_\theta) + B/A \, \delta(\omega_r, \omega_\theta)], \text{ where}$$

$\delta(\omega)$, $F'(\omega)$, R, A and B are as previously defined. Since the spatial response along the $\theta$ axis may be considered to be arbitrary, $F'(\omega_r, \omega_\theta) = F'(\omega_r) = 1$ for $0 \leq \omega_r \leq \omega_1$ and for $\omega_2 \leq \omega_r \leq \omega_3$, and $$F'(\omega_r) = 0$$

for $\omega_1 \leq \omega_r \leq \omega_2$ and for $\omega_r \leq \omega_3$, where $\omega_3 \leq \omega_2 \leq \omega_1$.

The corresponding point spread function is:

$$h(r,\theta) = h(r),$$

which may be solved to provide $$h(r) = \sum_{j=1}^{10} \psi_j \, circ\left(\frac{r}{a_j}\right), \text{ where}$$

$$\psi_j = \frac{1}{\Omega^2 \pi a_j^3} \frac{1}{J_2^2(a_j\Omega)} [\omega^2 J_2(a_j\omega_\psi) - \omega_2^2 J_2(a_j\omega_2) + \omega_3^2 J_2(a_j\omega_3)]$$

This point spread function may be plotted to provide a graph similar to that of FIG. 7, and thereafter used as the mask to form the spatial filter according to the method outlined hereinabove.

EXAMPLE 5

In another embodiment, the spatial filter may be selected to provide the optical system with a selective attenuation such that all spatial frequency components out to an upper cutoff frequency $\omega_c$ are passed, except for one or more two-dimensional bands of spatial frequency components which are controllably attenuated, each said band being defined by a lower cutoff frequency $\omega_1$ and an upper cutoff frequency $\omega_2$. This spatial filter may be used in analyzing topographic or other geophysical maps. A selective attenuator response may be devised so that one may ascertain contours sloping in a desired direction. Band-pass or band-stop attenuators which pass (or stop) selected spatial frequency bands (except for zero frequency which is always passed) may be used to view only those slopes having a certain grade on topographic maps. In such a system, the optical transfer function may be expressed by:

$$F(\omega) = R[1/A \, F'(\omega_x, \omega_y) + B/A \, \delta(\omega_x, \omega_y), \text{ where}$$

$F'(\omega_x, \omega_y)$, $\delta(\omega_x, \omega_y)$, R, A and B are previously defined, and where:

$F'(\omega_x, \omega_y) = 1$ for the regions:

a. $-\omega_{cx} \leq \omega_x \leq \omega_{cx}$, and $\omega_{y2} \leq \omega_y \leq \omega_{cy}$, b. $-\omega_{x1} \leq \omega_x \leq \omega_{x1}$, and $-\omega_{y2} \leq \omega_y \leq \omega_{y2}$, and c. $-\omega_{cx} \leq \omega_x \leq \omega_{cx}$, and $-\omega_{cy} \leq \omega_y \leq \omega_{y2}$, wherein $$\omega_{x2} = \omega_{cx},$$

$$-\omega_{x2} = \omega_{cx}, \text{ and}$$

$$\pm \omega_{yl} = 0$$

$F'(\omega_x, \omega_y) = 0$ for all other regions.

A plot of the design specification of this optical transfer function is shown in FIG. 5.

Once the transfer function $F(\omega_x,\omega_y)$ is selected, the point spread function and associated coefficients may be determined as follows:

$$h(x,y) = \sum_{m=1}^{10} \sum_{n=1}^{10} \psi_{mn} \, rect\left(\frac{\Omega_x x}{m\pi}\right) rect\left(\frac{\Omega_y y}{n\pi}\right), \text{ where}$$

$$\psi_{mn} = \frac{\Omega_x \Omega_y}{m^2 n^2 \pi^4} [\sin \frac{m\pi}{\Omega_x} \omega_{xc} - \frac{m\pi}{\Omega_x} \omega_{xc} \cos \frac{m\pi}{\Omega_x} \omega_{xc}]$$

$$\cdot [\sin \frac{n\pi}{\Omega_y} \omega_{yc} - \frac{n\pi}{\Omega_y} \omega_{yc} \cos \frac{n\pi}{\Omega_y} \omega_{yc}$$

$$- \sin \frac{n\pi}{\Omega_y} \omega_{yl} + \frac{n\pi}{\Omega_y} \omega_{yl} \cos \frac{n\pi}{\Omega_y} \omega_{yl}]$$

$$+ \frac{\Omega_x \Omega_y}{m^2 n^2 \pi^4} [\sin \frac{m\pi}{\Omega_x} \omega_{xl} - \frac{m\pi}{\Omega_x} \omega_{xl} \cos \frac{m\pi}{\Omega_x} \omega_{xl}]$$

$$\cdot [\sin \frac{n\pi}{\Omega_y} \omega_{yl} - \frac{n\pi}{\Omega_y} \omega_{yl} \cos \frac{n\pi}{\Omega_y} \omega_{yl}].$$

EXAMPLE 6

In another embodiment, the spatial filter may be selected to provide the system with a selective attenuator response by selecting the optical transfer function with respect to a circular coordinate system. In such a system, the optical transfer function may be expressed by:

$$F(\omega) = R[1/A \, F'(\omega_r, \omega_\theta) + B/A \, \delta(\omega_r, \omega_\theta), \text{ where}$$

$\delta(\omega_r, \omega_\theta)$, $F'(\omega_r, \omega_\theta)$, R, A and B are previously defined and where $$F'(\omega_r, \omega_\theta) =$$

-continued $$circ\left(\frac{\omega_r}{\omega_{rc}}\right)\left[rect\left(\frac{\omega_\theta + \frac{\pi}{2}}{\frac{\pi}{2} - \omega_{\theta c}}\right) + rect\left(\frac{\omega_\theta + \frac{3\pi}{2}}{\frac{\pi}{2} - \omega_{\theta c}}\right)\right],$$

$circ\left(\frac{\omega_r}{\omega_{rc}}\right) = 1$ for $0 \leq \omega_r \leq \omega_{rc}$, $circ\left(\frac{\omega_r}{\omega_{rc}}\right) = 0$ for $\omega_r > \omega_{rc}$, $rect\left(\frac{\omega_\theta + \frac{\pi}{2}}{\frac{\pi}{2} - \omega_{\theta c}}\right) = 1$ for $0 \leq |\omega_\theta + \frac{\pi}{2}| \leq \frac{\pi}{2} - \omega_{\theta c}$ $rect\left(\frac{\omega_\theta + \frac{\pi}{2}}{\frac{\pi}{2} - \omega_{\theta c}}\right) = 0$ for $|\omega_\theta + \frac{\pi}{2}| > \frac{\pi}{2} - \omega_{\theta c}$ $rect\left(\frac{\omega_\theta + \frac{3\pi}{2}}{\frac{\pi}{2} - \omega_{\theta c}}\right) = 1$ for $0 \leq |\omega_\theta + \frac{3\pi}{2}| \leq \frac{\pi}{2} - \omega_{\theta c}$, and $rect\left(\frac{\omega_\theta + \frac{3\pi}{2}}{\frac{\pi}{2} - \omega_{\theta c}}\right) = 0$ for $|\omega_\theta + \frac{\pi}{2}| > \frac{\pi}{2} - \omega_{\theta c}$.

The point spread function $h(r,\theta)$ for this optical transfer function may be determined by Fourier transformation of $F'(\omega)$ and plotted to form a mask, which is, in turn, used to form the transfer function hologram which controls the selective attenuator response of the system.

EXAMPLE 7

In another embodiment, the spatial filter may be selected to provide the system with a linear minimum mean square error response. In this embodiment, the spatial filter hologram provides the system with the following transfer function:

$$F(\omega) = \frac{S_{ss}}{S_{ss} + S_{nn}}$$

wherein $S_{ss}$ = power spectral density of specified patterns, and $S_{nn}$ = power spectral density of other patterns.

This spatial filter may be utilized in an apparatus for recognizing specified patterns from a plurality of patterns. The spatial filter controls the given transfer function of the system such that said radiation distributed from an object containing a plurality of patterns is spatially filtered to preferentially pass specified patterns within an interval of spatial frequencies $0 \leq \omega \leq \Omega$. Such a filter distinguishes spatial frequency components defining the specified patterns and enables the lens to provide processed convolution and/or correlation images of the filtered radiation distributed from the object at the predetermined image plane to thereby provide an image containing said specified patterns at said image plane.

The spatial filter described in this example may also be utilized in an apparatus for determining the concentration of a species such as particulate matter having a predetermined specific pattern. The spatial filter controls a given transfer function for spatially filtering the radiation distributed from the species within an interval of spatial frequencies $0 \leq \omega \leq \Omega$, and enables the lens to provide at the predetermined image plane processed convolution and/or correlation images of the filtered radiation distributed from the species having the predetermined specific pattern.

The apparatus described in this example may be utilized for selecting and/or determining the concentration of particular types of cells within a sample of cells from a large number of patterns. For example, this function permits one to select reticulocytes from normal red blood cells. Likewise such an apparatus may be used for the analysis of dust particles, aerosol sprays, or pigments.

EXAMPLE 8

In yet another embodiment, the spatial filter may be selected to provide the optical system with a correctional filter response for correcting images which have been degraded by a medium having an optical transfer function of $G(\omega)$ such as that which typically occurs during multiple generation copying. The optical transfer function provided by the spatial filter is:

$$F(\omega) = R[(1/A) F'(\omega) + (B/A) \delta(\omega)],$$

where $F'(\omega)$, $\delta(\omega)$, R, A and B are as previously defined, and where $F'(\omega) = (1/G(\omega))$ for $G(\omega) \neq 0$, and $F'(\omega) = K$ for $G(\omega) = 0$, wherein K is a constant chosen to be as large as practical.

The point spread function for this optical transfer function may be determined by Fourier transformation of $F'(\omega)$ and plotted to provide the mask used to form the spatial filter hologram as in the previous examples.

Full color processing may also be accomplished by using color separation techniques. The number of spatial filter holograms controlling the optical transfer functions of the resultant systems which would then be utilized preferably would be the same as the number of sources of spatially incoherent monochromatic light. Accordingly, color processing may be accomplished in the embodiments of the present invention according to all of the foregoing examples by including a spatial filter that provides a plurality of discrete optical transfer functions for respectively spatially filtering a plurality of discrete color components of the light distributed from said object. In the color processing embodiments, it is also preferred that the incoherent light source of the system include means for providing incoherent light consisting of the same plurality of discrete color components.

The spatial filter hologram to be used in a system to provide such a plurality of transfer functions is holographically recorded, as described with reference to FIG. 2 above, by multiple exposure of the holographic medium 36 to monochromatic beams of each of the desired color component wavelengths. The intensity distribution for each wavelength is in accordance with the point spread function corresponding to the a priori transfer function desired for each such wavelength.

In the color processing embodiments, it is necessary to suppress undesired intermodulation terms that inherently are produced. This is accomplished by providing the reference beam at such an angle during production of the spatial filter (FIG. 2) that the intermodulation terms will not overlap when the spatial filter is used in the processing system (FIG. 1) and also by the positioning of an aperture in the image plane 27, such that only the desired correct composite color image will be detected.

Objects containing graphic images may include but are not limited to documents; three-dimensional figures or scenes; self-luminous objects in either one, two, or three dimensions; and transparencies.

Having thus described the present invention, what is claimed is:

1. A method of producing a spatial filter which when combined with a lens in a system for processing incoherent electromagnetic radiation, provides a given, real two-dimensional transfer function $F(\omega)$ for spatially filtering said radiation within an interval of spatial frequencies $0 \leq \omega \leq \Omega$, said method comprising the steps of:
   a. generating a two-dimensional mask having regions of varying optical transmissivity or reflectivity,
   b. impinging a coherent beam of electromagnetic radiation onto the mask and impinging radiation passing therethrough onto a medium responsive to said radiation,
   c. impinging a reference beam of electromagnetic radiation, which beam is coherent with the other beam, onto the responsive medium to cause an interference between the two beams and to produce as a said spatial filter a hologram corresponding to the mask,
   wherein the improvement comprises generating the mask according to the sub-steps of
   i. providing a medium including a planar surface having a rectangular coordinate grid including a plurality of regularly spaced regions,
   ii. developing the optical transmissivity or reflectivity of each region such that regions symmetrically disposed with respect to the coordinate axes of the grid, thereby corresponding to a real transfer function $F(\omega)$, have the same optical transmissivity or reflectivity, the transmissivity or reflectivity of each region being defined by the following point spread function:

$$h(x,y) = \sum_{m=1}^{M} \sum_{n=1}^{N} \psi_{mn} \text{rect}\left(\frac{\Omega_x x}{m\pi}\right) \text{rect}\left(\frac{\Omega_y y}{n\pi}\right),$$

wherein
$h(x,y)$ is the point spread function corresponding to a selected design transfer function $F'(\omega_x,\omega_y)$,
$m, n$ are spatial limits in the $x$ and $y$ directions, respectively,
$\omega_x$ is the spatial frequency along the $x$-direction,
$\omega_y$ is the spatial frequency along the $y$-direction,
$\Omega_x$ is the cutoff spatial frequency in the $x$-direction,
$\Omega_y$ is the cutoff spatial frequency in the $y$-direction, $$\text{rect}\left(\frac{\Omega_x x}{m\pi}\right) = 1 \text{ for } 0 \leq x \leq \frac{m\pi}{\Omega_x},$$

$$\text{rect}\left(\frac{\Omega_x x}{m\pi}\right) = 0 \text{ for } x > \frac{m\pi}{\Omega_y},$$

$$\text{rect}\left(\frac{\Omega_y y}{m\pi}\right) = 1 \text{ for } 0 \leq y \leq \frac{n\pi}{\Omega_y},$$

$$\text{rect}\left(\frac{\Omega_y y}{n\pi}\right) = 0 \text{ for } x > \frac{n\pi}{\Omega_y},$$

$$\psi_{mn} = \frac{1}{\Omega_x \Omega_y} \int_0^{\Omega_x} \int_0^{\Omega_y} \omega_x \omega_y F(\omega_x, \omega_y) \sin\left(m\pi \frac{\omega_x}{\Omega_x}\right) \sin\left(n\pi \frac{\omega_y}{\Omega_y}\right) d\omega_x d\omega_y,$$

$F'(\omega_x,\omega_y)$ is the design, i.e., a priori, transfer function of the desired spatial filter, and is defined between the limits $0 \leq \omega_x \leq \Omega_x$ and $0 \leq \omega_y \leq \Omega_y$, such that $F(\omega_x,\omega_y) = R[(1/A) F'(\omega_x,\omega_y) + (B/A) \delta(\omega_x,\omega_y)]$, where $R = (A/1+B)$, A is a multiplier constant equal to the maximum value of $h(x,y)$ minus the minimum value of $h(x,y)$ and B is a bias constant equal to the negative of the minimum value of $h(x,y)$, thereby enabling the point spread function $h(x,y)$ corresponding to the transfer function $F(\omega_x,\omega_y)$ to be real and in the range $0 \leq h(x,y) \leq 1$.

2. A method of producing a spatial filter which, when combined with a lens in a system for processing incoherent electromagnetic radiation, provides a given, real two-dimensional transfer function $F(\omega)$ for spatially filtering said radiation within an interval of spatial frequencies $0 \leq \omega \leq \Omega$, said method comprising the steps of
generating a two-dimensional mask having regions of varying optical transmissivity or reflectivity,
impinging a coherent electromagnetic radiation beam onto the mask and impinging radiation passing therethrough onto a medium responsive to said radiation,
impinging a reference beam of electromagnetic radiation, which beam is coherent with the other beam, onto the responsive medium to cause an interference between the two beams and to produce as a said spatial filter a hologram corresponding to the mask,
wherein the improvement comprises generating the mask according to the sub-steps of
i. providing a medium including a planar surface having a circular coordinate grid including a plurality of regularly spaced regions,
ii. developing the optical transmissivity or reflectivity of each region such that regions symmetrically disposed with respect to the coordinate axes of the grid, thereby corresponding to a real transfer function $F(\omega)$, have the same optical transmissivity or reflectivity, the transmissivity or reflectivity of each region being defined by the following point spread function:

$$h(r) = \sum_{j=1}^{M} \psi_j \text{circ}\left(\frac{r}{a_j}\right), \text{ wherein}$$

$h(r)$ is the point spread function corresponding to a selected design transfer function $F'(\omega_r,\omega_\theta) = F'(\omega_r)$.

$a_j$ is the spatial limit along the r-axis,
$\omega_r$ is the spatial frequency along the r-axis,
$\Omega_r$ is the cutoff spatial frequency in the r-direction, $$\text{circ}\left(\frac{r}{a_j}\right) = 1 \text{ for } 0 \leq r \leq a,$$

$$\text{circ}\left(\frac{r}{a_j}\right) = 0 \text{ for } r \geq a,$$

$$\psi_j = \frac{1}{\pi\Omega^2 a_j J_2^2(a_j\Omega)} \int_0^\Omega \omega_r^2 F'(\omega_r) J_1(a_j\omega_r) d\omega_r,$$

the coefficients $a_j$ are the solutions to:
$J_1(a_j\Omega) = 0$ for $j = 1, 2, \ldots$,
$F'(\omega_r)$ is the design, i.e., a priori transfer function of the desired spatial filter and is defined between the limits $0 \leq \omega_r \leq \Omega$ such that
$F(\omega) = R[(1/A) F'(\omega) + (B/A) \delta(\omega_r)]$, where
$R = (A/1+B)$, A is a multiplier constant equal to the maximum value of $h(r)$ minus the minimum value of $h(r)$, and B is a bias constant equal to the negative of the minimum value of $h(r)$, thereby enabling the point spread function $h(r)$ corresponding to the transfer function of $F(\omega)$ to be real and in the range $0 \leq h(r) \leq 1$.

3. An apparatus for processing an original image containing a plurality of different complex patterns to provide a modified image in which at least one of said complex patterns is substantially unaltered, said apparatus including a system for image processing comprising
a source of spatially incoherent electromagnetic radiation positioned for directing said radiation to an object containing a said original image to provide an intensity distribution of electromagnetic radiation from said object; and
a lens for providing a processed image of said radiation distributed from said object at a predetermined image plane;
the improvement wherein the apparatus further comprises
a spatial filter which is a Fourier transform hologram containing therein a two-dimensional point spread function, and which when combined with said lens in said system as a lens pupil for processing incoherent electromagnetic radiation, spatially filters said radiation distributed from said object to attenuate predetermined discrete spatial frequency components within an interval of spatial frequencies $0 \leq \omega \leq \Omega$ to provide at the predetermined image plane processed convolution and/or correlation images of said filtered radiation distributed from said objects, wherein within said processed convolution and/or correlation images the transmissivity or reflectivity of the hologram causes the optical transfer function to controllably attenuate said predetermined discrete spatial frequency components of said original image and to substantially unalter at least one of said complex patterns.

4. An apparatus according to claim 3, characterized by
the spatial filter providing a directional response for passing substantially higher spatial frequency components in a first direction than are passed in a second direction.

5. An apparatus according to claim 3, characterized by
the spatial filter providing a notch filter response for passing all spatial frequency components in one or more directions within a given band of spatial frequencies except for one or more discrete sub-bands of spatial frequency components within said given band, with said sub-band components being substantially attenuated.

6. An apparatus according to claim 3, characterized by
the spatial filter providing a selective attenuator response for passing all spatial frequency components out to an upper cutoff frequency $\omega_c$ except for one or more two-dimensional bands of spatial frequency components, each said band being defined by a lower cutoff frequency $\omega_1$ and an upper cutoff frequency $\omega_2$, wherein all spatial frequency components within said band are substantially attenuated.

7. An apparatus according to claim 3, wherein the spatial filter hologram corresponds to a point spread function and to an optical transfer function $F(\omega)$ in which the reflectivity or transmissivity of the hologram causes the optical transfer function to be capable of reproducing a desired feature of said object in the presence of other features of said object with minimum mean square error.

8. An apparatus according to claim 3 for recognizing at least one said substantially unaltered complex pattern as a specified pattern from a plurality of different complex patterns,
wherein the transmissivity or reflectivity of the hologram causes the transfer function to provide an image containing said specified patterns at said image plane.

9. An apparatus according to claim 3 for determining the concentration of a predetermined species such as particulate matter within a plurality of different species, wherein the different species are identified as said different complex patterns, wherein the predetermined species are identified as said predetermined specific pattern; wherein the transmissivity or reflectivity of the hologram causes the optical transfer function to provide processed convolution and/or correlation images of said filtered radiation distributed from said species having said predetermined specific pattern at the predetermined image plane; and wherein a detector is provided for measuring the total intensity in said convolution or correlation image.

10. An optical system according to claim 3, wherein the spatial filter hologram corresponds to a point spread function and to an optical transfer function $F(\omega)$ in which the transmissivity or reflectivity of the hologram causes the optical transfer function to provide a filter response for correcting images which have been degraded by a medium having an optical transfer function $G(\omega)$;
wherein the spatial response is given by the optical transfer function: $F(\omega) = R[(1/A) F'(\omega) + (B/A) \delta(\omega)]$, where
$F'(\omega) = (1/G(\omega))$ for $G(\omega) \neq 0$, and $\delta(\omega)$ is the Dirac delta function, $F'(\omega)$ is the selected design transfer function dictated by the expression:

$$F'(\omega) = K \text{ for } G(\omega) = 0,$$

wherein K is a constant chosen to be as large as practical, and where
$R = (A/1+B)$, A is a multiplier constant equal to the maximum value of $h(x,y)$ minus the minimum value of $h(x,y)$ and B is a bias constant equal to the negative of the minimum value of $h(x,y)$, thereby enabling the point spread function $h(x,y)$ corresponding to the transfer function $F(\omega_x,\omega_y)$ to be real and in the range $0 \leq h(x,y) \leq 1$.

11. A linear optical system for image processing comprising
   a source of spatially incoherent light positioned for directing said light to an object to provide an intensity distribution of light from said object;
   a spatial filter which is a Fourier transform hologram of a two-dimensional point spread function for spatially processing said incoherent light distributed from said object within an interval of spatial frequencies $0 \leq \omega \leq \Omega$; and
   a lens for providing at a predetermined image plane processed convolution and/or correlation images of said processed light distributed from said object;
   the improvement wherein
   the spatial filter hologram corresponds to a point spread function and to an optical transfer function, and wherein the transmissivity or reflectivity of the hologram causes the optical transfer function to extend to substantially higher spatial frequencies in one of said two dimensions than in the other dimension.

12. A linear optical system for image processing comprising
   a source of spatially incoherent light positioned for directing said light to an object to provide an intensity distribution of light from said object;
   a spatial filter which is a Fourier transform hologram of a two-dimensional point spread function for spatially processing said incoherent light distributed from said object within an interval of spatial frequencies $0 \leq \omega \leq \Omega$;
   a lens for providing at a predetermined image plane processed convolution and/or correlation images of said processed light distributed from said object;
   the improvement wherein
   the spatial filter hologram corresponds to a point spread function and to an optical transfer function, providing a notch filter response, and wherein the transmissivity or reflectivity of the hologram causes the optical transfer function to pass substantially all spatial frequency components in one or more directions within a given band of spatial frequencies except for one or more sub-bands which are substantially attenuated.

13. An optical system for image processing comprising
   a source of spatially incoherent light positioned for directing said light to an object to provide an intensity distribution of light from said object;
   a spatial filter which is a Fourier transform hologram of a two-dimensional point spread function for spatially filtering said light distributed from said object within an interval of spatial frequencies $0 \leq \omega \leq \Omega$; and
   a lens for providing at a predetermined image plane processed convolution and/or correlation images of said filtered light distributed from said object;
   the improvement wherein
   the spatial filter hologram corresponds to a point spread function and to an optical transfer function $F(\omega)$, and wherein the transmissivity or reflectivity of the hologram causes the optical transfer function to provide a selective attenuator response for controllably passing all spatial frequency components out to an upper cutoff spatial frequency $\omega_c$, except for one or more two-dimensional bands of spatial frequency components, each said band being defined by a lower cutoff frequency $\omega_1$ and an upper cutoff frequency $\omega_2$, wherein all spatial frequency components within each band are controllably attenuated.

14. An optical system according to claim 4, characterized by the optical transfer function being
$F(\omega) = R[(1/A) F'(\omega_x,\omega_y) + (B/A) \delta(\omega_x,\omega_y)]$ where
$\delta(\omega_x,\omega_y)$ is the Dirac delta function,
$F'(\omega_x,\omega_y)$ is the selected design transfer function, dictated by the desired directional response according to the expression:
$F'(\omega_x,\omega_y) = \text{rect}(\omega_x/\omega_{cx}) \text{rect}(\omega_y/\omega_{cy})$, where
$\omega_{cx}$ and $\omega_{cy}$ are cutoff spatial frequencies in the $x$ and $y$ directions respectively, $\text{rect}(\omega_x/\omega_{cx}) = 1$ for $0 \leq |\omega_x| \leq \omega_{cx}$, $\text{rect}(\omega_x/\omega_{cx}) = 0$ for $|\omega_x| > \omega_{cx}$, $\text{rect}(\omega_y/\omega_{cy}) = 1$ for $0 \leq |\omega_y| \leq \omega_{cy}$, $\text{rect}(\omega_y/\omega_{cy}) = 0$ for $|\omega_y| > \omega_{cy}$, $F\omega_{cx} \neq \omega_{cy}$, $R = (A/1+B)$, $A =$ a multiplier constant equal to the maximum value of $h(x,y)$ minus the minimum value of $h(x,y)$ and B is a bias constant equal to the negative of the minimum value of $h(x,y)$ thereby enabling the point spread function $h(x,y)$ corresponding to the transfer function $F(\omega_x,\omega_y)$ to be real and in the range $0 \leq h(x,y) \leq 1$.

15. An optical system according to claim 4, characterized by the optical transfer function being
$F(\omega) = R[(1/A) F'(\omega_r,\omega_\theta) + (B/A) \delta(\omega_r,\omega_\theta)]$ where
$\delta(\omega_r,\omega_\theta)$ is the Dirac delta function,
$F'(\omega_r,\omega_\theta)$ is the selected design transfer function dictated by the desired directional response according to the expression:
$F(\omega_r,\omega_\theta) = \text{circ}(\omega_r/\omega_{cr})[\text{rect}(\omega_\theta/\omega_{c\theta}) + \text{rect}(\omega_\theta - \pi/\omega_{c\theta})]$, where
$\omega_{cr}$ and $\omega_{c\theta}$ are cutoff spatial frequencies along the $r$ and $\theta$ axes, respectively, $\text{circ}\left(\frac{\omega_r}{\omega_{cr}}\right) = 1$ for $0 \leq \omega_r \leq \omega_{cr}$, $\text{circ}\left(\frac{\omega_r}{\omega_{cr}}\right) = 0$ for $\omega_r > \omega_{cr}$, $\text{rect}\left(\frac{\omega_\theta}{\omega_{c\theta}}\right) = 1$ for $0 \leq |\omega_\theta| \leq \omega_{c\theta}$, $\text{rect}\left(\frac{\omega_\theta}{\omega_{c\theta}}\right) = 0$ for $|\omega_\theta| > \omega_{c\theta}$, $\text{rect}\left(\frac{\omega_\theta - \pi}{\omega_{c\theta}}\right) = 1$ for $0 \leq |\omega_\theta - \pi| \leq \omega_{c\theta}$ $\text{rect}\left(\frac{\omega_\theta - \pi}{\omega_{c\theta}}\right) = 0$ for $|\omega_\theta - \pi| > \omega_{c\theta}$, $R = (A/1+B)$, $A =$ a multiplier constant equal to the maximum value of $h(r,\theta)$ minus the minimum value of $h(r,\theta)$ and B is a bias constant equal to the negative of the minimum value of $h(r,\theta)$, thereby enabling the point spread function $h(r,\theta)$ corresponding to the transfer function $F(\omega_r,\omega_\theta)$ to be real and in the range $0 \leq h(r,\theta) \leq 1$.

16. An optical system according to either claim 6, characterized by the optical transfer function being
$F(\omega) = R[(1/A) F'(\omega_x,\omega_y) + (B/A) \delta(\omega_x,\omega_y)]$ where
$\delta(\omega_x,\omega_y)$ is the Dirac delta function,
$F'(\omega_x,\omega_y)$ is the selected design transfer function dictated by the desired notch filter response according to the expression:
$F'(\omega_x,\omega_y) = F'(\omega_x) F'(\omega_y)$, where $F'(\omega_x) = \frac{1}{2}[1 + \cos(2\pi\omega_x/aT_1)] \text{rect}(\omega_x/T_1)$, $F'(\omega_y)$ may be arbitrarily selected $\text{rect}(\omega_x/T_1) = 1$ for $0 \leq |\omega_x| \leq T_1$, $\text{rect}(\omega_x/T_1) = 0$ for $|\omega_x| > T_1$, $T_1 \leq \Omega_x$, $0 < a < 1$, $R = A/1+B$, $A =$ a multiplier constant equal to the maximum value of $h(x,y)$ minus the minimum value of $h(x,y)$ and B is a bias constant equal to the negative of the minimum value of $h(x,y)$, thereby enabling the point spread function $h(x,y)$ corresponding to the transfer function $F(\omega_x,\omega_y)$ to be real and in the range $0 \leq h(x,y) \leq 1$.

17. An optical system according to either claim 6, characterized by the optical transfer function being
$F(\omega) = R[(1/A) F'(\omega_r,\omega_\theta) + (B/A) \delta(\omega_r,\omega_\theta)]$ where
$\delta(\omega_r,\omega_\theta)$ is the Dirac delta function,
$F'(\omega_r,\omega_\theta)$ is the selected design transfer function dictated by the desired notch filter response according to the expression:
$F(\omega_r,\omega_\theta) = F'(\omega_r)$,
where $F'(\omega_r) = 1$ for $0 \leq \omega_r \leq \omega_1$, and for $\omega_2 \leq \omega \leq \omega_3$, $F'(\omega_r) = 0$ for $\omega_1 < \omega_r < \omega_2$, and for $\omega_r > \omega_3$, wherein $\omega_3 > \omega_2 > \omega_1$, $R = A/1+B$, $A =$ a multiplier constant equal to the maximum value of $h(r,\theta)$ minus the minimum value of $h(r,\theta)$ and B is a bias constant equal to the negative of the minimum value of $h(r,\theta)$, thereby enabling the point spread function $h(r,\theta)$ corresponding to the transfer function $F(\omega_r,\omega_\theta)$ to be real and in the range $0 \leq h(r,\theta) \leq 1$.

18. An optical system according to either claim 5, wherein the spatial filter provides the optical transfer function:
$F(\omega) = R[(1/A) F'(\omega_x,\omega_y) + (B/A) \delta(\omega_x,\omega_y)]$, where
$\delta(\omega_x,\omega_y)$ is the Dirac delta function,
$F'(\omega_x,\omega_y)$ is the selcted design transfer function dictated by the desired selective attenuator response according to the expression:

$F'(\omega_x,\omega_y) = 1$ for the regions:

a. $-\omega_{cx} \leq \omega_x \leq \omega_{cx}$, and $\omega_{y2} \leq \omega_y \leq \omega_{cy}$, b. $-\omega_{x1} \leq \omega_x \leq \omega_{x1}$, and $-\omega_{y2} \leq \omega_y \leq \omega_{y2}$, and c. $-\omega_{cx} \leq \omega_x \leq \omega_{cx}$, and $-\omega_{cy} \leq \omega_y \leq -\omega_{y2}$, wherein $\omega_{x2} = \omega_{cx}$, $-\omega_{x2} = \omega_{cx}$, and $\pm \omega_{yl} = 0$, $F'(\omega_x,\omega_y) = 0$ for all other regions, and
$R = (A/1+B)$, A is a multiplier constant equal to the maximum value of $h(x,y)$ minus the minimum value of $h(x,y)$ and B is a bias constant equal to the negative of the minimum value of $h(x,y)$, thereby enabling the point spread function $h(x,y)$ corresponding to the transfer function $F(\omega_x,\omega_y)$ to be real and in the range $0 \leq h(x,y) \leq 1$.

19. An optical system according to either claim 5, wherein the spatial filter provides the optical transfer function:
$F(\omega) = R[(1/A \; F'(\omega_r,\omega_\theta) + (B/A) \delta(\omega_r,\omega_\theta))]$, where
$\delta(\omega_r,\omega_\theta)$ is the Dirac delta function,
$F'(\omega_r,\omega_\theta)$ is the selected design transfer function dictated by the desired selective attenuator response according to the expression:

$$F(\omega_r,\omega_\theta) = \text{circ}\left(\frac{\omega_r}{\omega_{rc}}\right)\left[\text{rect}\left(\frac{\omega_\theta + \frac{\pi}{2}}{\frac{\pi}{2} - \omega_{\theta c}}\right) + \text{rect}\left(\frac{\omega_\theta + \frac{3\pi}{2}}{\frac{\pi}{2} - \omega_{\theta c}}\right)\right]$$

wherein $\text{circ}\left(\frac{\omega_r}{\omega_{rc}}\right) = 1$ for $0 \leq \omega_r \leq \omega_{rc}$, $\text{circ}\left(\frac{\omega_r}{\omega_{rc}}\right) = 0$ for $\omega_r > \omega_{rc}$, $\text{rect}\left(\frac{\omega_\theta + \frac{\pi}{2}}{\frac{\pi}{2} - \omega_{\theta c}}\right) = 1$ for $0 \leq |\omega_\theta + \frac{\pi}{2}| \leq \frac{\pi}{2} - \omega_{\theta c}$, $\text{rect}\left(\frac{\omega_\theta + \frac{\pi}{2}}{\frac{\pi}{2} - \omega_{\theta c}}\right) = 0$ for $|\omega_\theta + \frac{\pi}{2}| > \frac{\pi}{2} - \omega_c$, $\text{rect}\left(\frac{\omega_\theta + \frac{3\pi}{2}}{\frac{\pi}{2} - \omega_{\theta c}}\right) = 1$ for $0 \leq |\omega_\theta + \frac{3\pi}{2}| \leq \frac{\pi}{2} - \omega_{\theta c}$, $$\text{rect}\left(\frac{\omega_\theta + \frac{3\pi}{2}}{\frac{\pi}{2} - \omega_{\theta c}}\right) = 0 \text{ for } |\omega_\theta + \frac{\pi}{2}| > \frac{\pi}{2} \omega_{\theta c},$$

$\omega_{rc}$ is the cutoff spatial frequency in the $r$ direction,
$\omega_{\theta c}$ is the cutoff spatial angle in the $\theta$ direction, and
R = (A/1+B), A is a multiplier constant equal to the maximum value of $h(x,y)$ minus the minimum value of $h(x,y)$ and B is a bias constant equal to the negative of the minimum value of $h(x,y)$, thereby enabling the point spread function $h(x,y)$ corresponding to the transfer function $R(\omega_x,\omega_y)$ to be real and in the range $0 \leq h(x,y) \leq 1$.

20. An apparatus according to claim 3, wherein said spatial filter when combined with said lens in said system provides a plurality of discrete optical transfer functions for respectively spatially filtering a plurality of discrete color components of said electromagnetic radiation distributed from said object.

21. An optical system according to claim 3, wherein the spatial filter hologram corresponds to a point spread function and to an optical transfer function F(ω) in which the reflectivity or transmissivity of the hologram causes the optical transfer function to be capable of reproducing a desired feature of said object in the presence of other features of said object with minimum means square error.

22. An optical system according to claim 21, wherein the spatial filter and lens provide the optical transfer function:

$$F(\omega) = \frac{S_{ss}}{S_{ss} + S_{nn}}$$

wherein $S_{ss}$ = power spectral density of specified patterns:
and $S_{nn}$ = power spectral density of other patterns.

* * * * *

UNITED STATES PATENT AND TRADEMARK OFFICE
CERTIFICATE OF CORRECTION

PATENT NO. : 4,082,431
DATED : April 4, 1978
INVENTOR(S) : Joseph E. Ward, III

It is certified that error appears in the above-identified patent and that said Letters Patent are hereby corrected as shown below:

Column 9, line 18, change "0" to -- in --.

Column 15, line 60, change "$\text{rect}\left(\frac{\Omega_y y}{n\pi}\right),$" to -- $\text{rect}\left(\frac{\Omega_y y}{n\pi}\right),$ --.

Column 17, line 5, change "$\text{circ}\left(\frac{r}{a_j}\right)=$" to -- $\text{circ}\left(\frac{r}{a_j}\right)=$ --.

Column 23, line 13, change "R" to -- F --.

Signed and Sealed this

*Twenty-second* Day of *August 1978*

[SEAL]

Attest:

RUTH C. MASON
*Attesting Officer*

DONALD W. BANNER
*Commissioner of Patents and Trademarks*